United States Patent
Dixit

(10) Patent No.: US 10,089,214 B1
(45) Date of Patent: Oct. 2, 2018

(54) AUTOMATED DETECTION OF FAULTS IN TARGET SOFTWARE AND TARGET SOFTWARE RECOVERY FROM SOME FAULTS DURING CONTINUING EXECUTION OF TARGET SOFTWARE

(71) Applicant: Northrop Grumman Systems Corporation, Falls Church, VA (US)

(72) Inventor: Sunil Dixit, Torrance, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 162 days.

(21) Appl. No.: 15/268,870

(22) Filed: Sep. 19, 2016

(51) Int. Cl.
  *G06F 11/00* (2006.01)
  *G06F 11/36* (2006.01)
(52) U.S. Cl.
  CPC ........ *G06F 11/366* (2013.01); *G06F 11/3688* (2013.01)
(58) Field of Classification Search
  CPC ..................... G06F 11/366; G06F 11/3688
  See application file for complete search history.

(56) References Cited

U.S. PATENT DOCUMENTS

2013/0339574 A1* 12/2013 Franceschini ....... G06F 12/0246
  711/103
2016/0034270 A1* 2/2016 Swierc ................ G06F 11/3668
  717/126

* cited by examiner

*Primary Examiner* — Bryce P Bonzo
*Assistant Examiner* — Katherine Lin
(74) *Attorney, Agent, or Firm* — Patti & Malvone Law Group, LLC

(57) ABSTRACT

An exemplary method provides for automatically curing a detected behavior anomaly in executing target software during the continuing execution of the target software. Ranges of parameters of acceptable behaviors are stored. One behavior is detected that is outside the range of parameters for acceptable behavior for the corresponding behavior. A probability of success is predicted for restoring the corresponding behavior to acceptable behavior. First bytes associated with the behavior anomaly are replaced with the other bytes upon the predicted probability of success exceeding a predetermined success threshold, thereby automatically implementing a likely cure of a detected anomaly in the target software during the continuous execution of the target software.

12 Claims, 4 Drawing Sheets

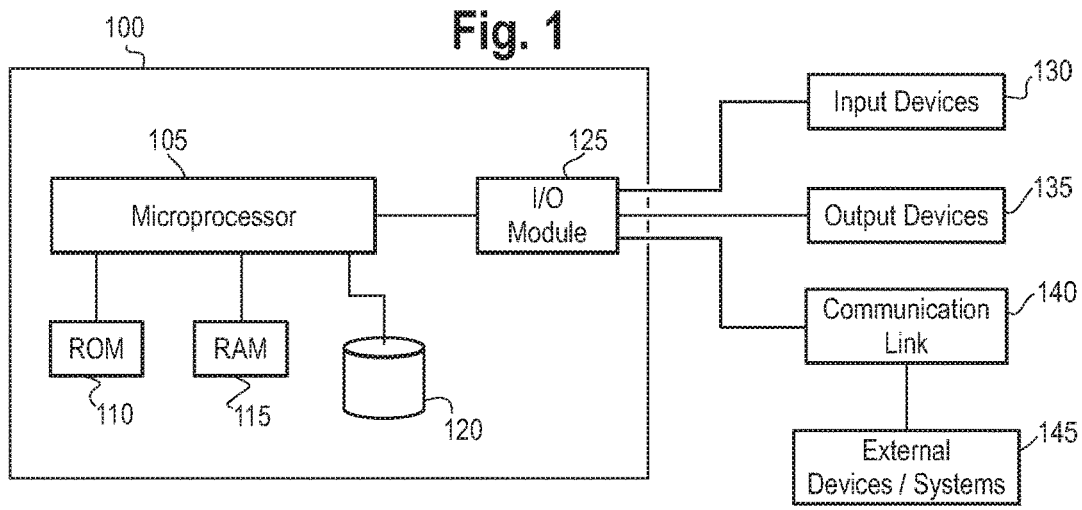
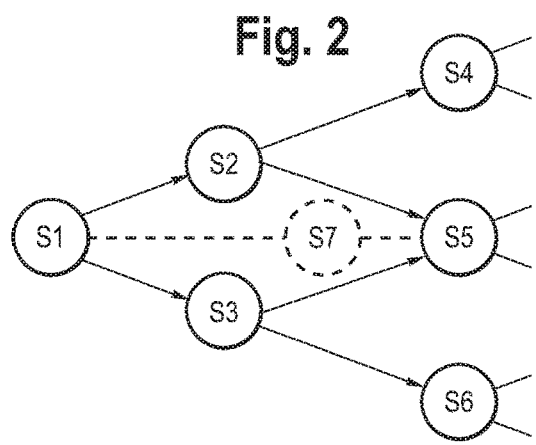
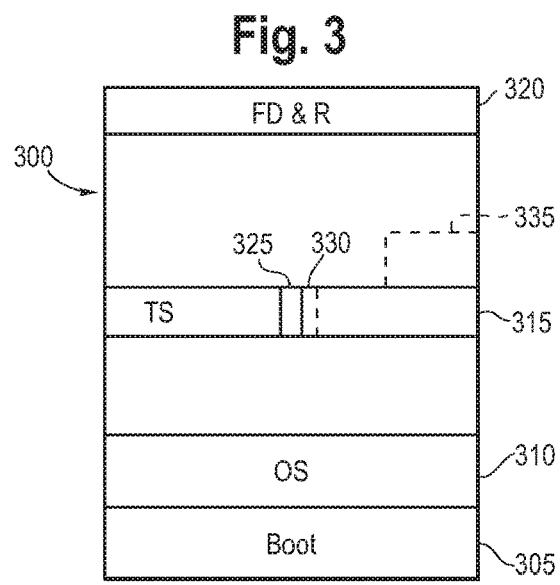

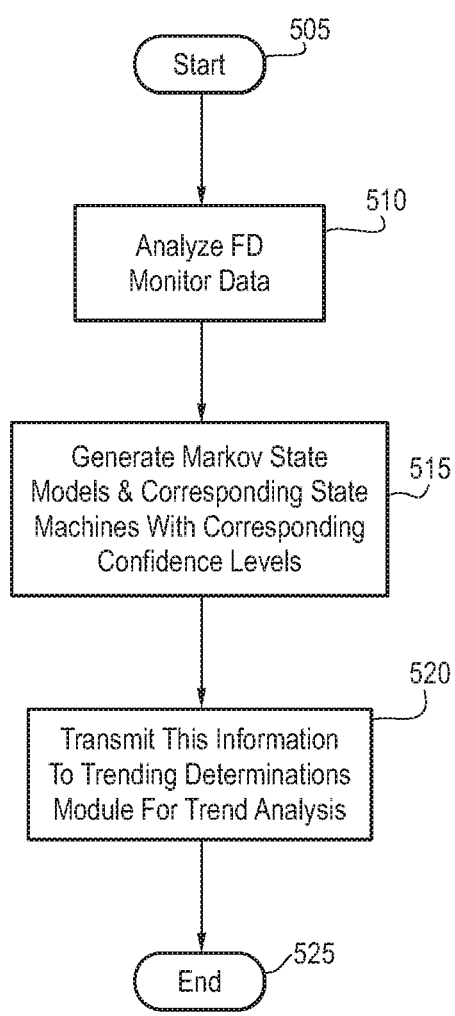

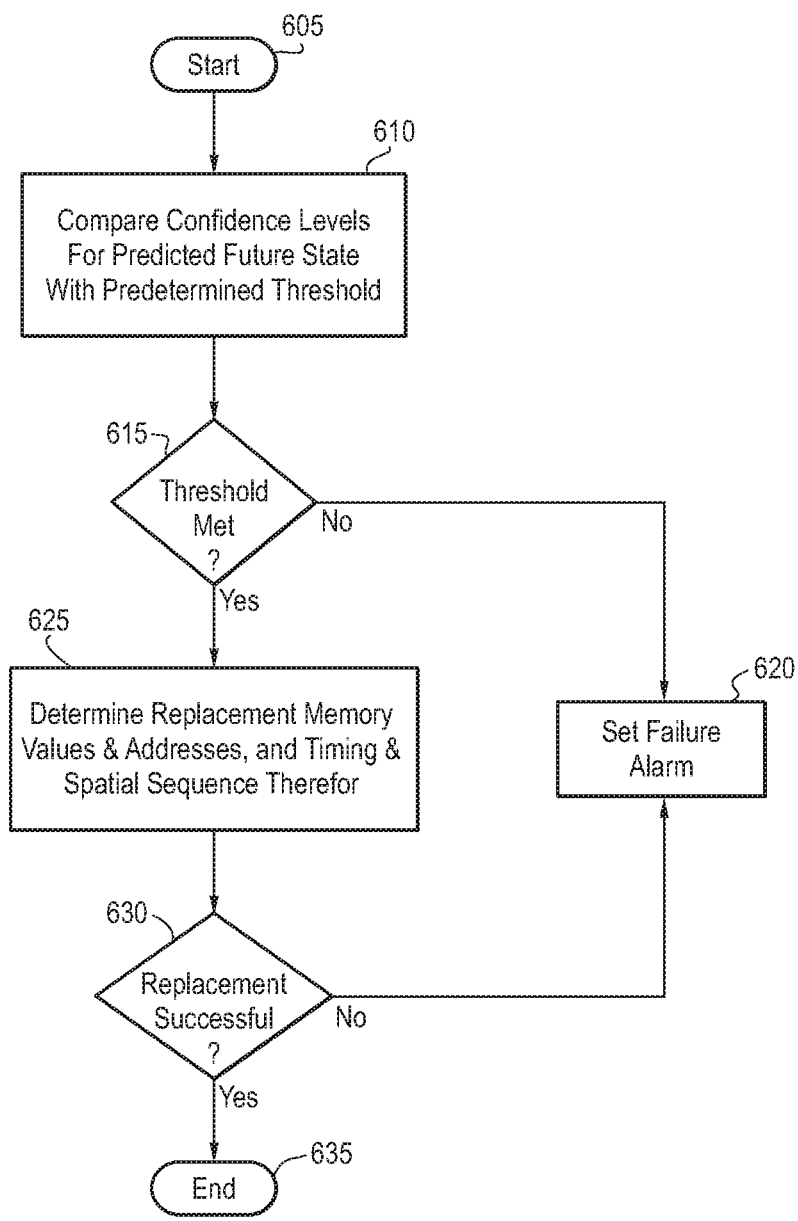

AUTOMATED DETECTION OF FAULTS IN TARGET SOFTWARE AND TARGET SOFTWARE RECOVERY FROM SOME FAULTS DURING CONTINUING EXECUTION OF TARGET SOFTWARE

BACKGROUND

This invention relates to automatically determining that faults or failures exist in target software that is executing, determining action, if any, that can be taken to eliminate these faults/failures, and implementing the action, while the target software continues its operation.

There are a variety of faults that can adversely affect the anticipated execution of software. For example, there are Trojans, Viruses, Worms, buffer overflow, mal-formed interactions with degraded hardware, etc. An input utilized by the software may be unexpected, i.e. text may be entered where a numerical entry is anticipated, the value of an input may exceed an anticipated range of values, etc. This may cause the software to enter a state not anticipated by the software designer and thereby cause the operation of the software itself to function in an unanticipated (anomalous) manner. A series of inputs, even within an anticipated range, may appear in a combination or series that produces unexpected and/or unintended states of the software in space and/or time of the execution. Similarly, unexpected output values or unexpected intermediate values/states may result in unexpected software states/actions. The memory locations (address range) and/or size of memory utilized during the execution of the software may vary unexpectedly from the anticipated behavior. For example, the software may become infected with "malware" which may increase the occupied size of the memory of the software itself or may redirect the software to access a software module associated with the malware outside of the original software memory map.

There exists a need for an improved technique for determining if such software faults or failures are present and eliminating, if possible, the root cause of the faults/failures. It is preferable that the determination of software fault(s)/failure(s) and the elimination of the fault(s)/failure(s) be accomplished automatically while the execution of the subject software continues without interruption.

SUMMARY

It is an object of the present invention to satisfy this need.

An exemplary method provides for automatically curing a detected behavior anomaly in executing target software during the continuing execution of the target software. Ranges of parameters of acceptable behaviors are stored. One behavior is detected that is outside the range of parameters for acceptable behavior for the corresponding behavior. A probability of success is predicted for restoring the corresponding behavior to acceptable behavior. First bytes associated with the behavior anomaly are replaced with the other bytes upon the predicted probability of success exceeding a predetermined success threshold, thereby automatically implementing a likely cure of the detected anomaly in the target software during the continuous execution of the target software.

DESCRIPTION OF THE DRAWINGS

Features of exemplary implementations of the invention will become apparent from the description, the claims, and the accompanying drawings in which:

FIG. 1 is a block diagram of an exemplary computing environment suited for use with an embodiment of the present invention.

FIG. 2 illustrates a partial diagram of representative states of a computer program.

FIG. 3 shows a representative map of computer memory.

FIG. 5 is a flow diagram illustrating exemplary steps implemented by the predictive analytics module 450.

FIG. 6 is a flow diagram illustrating exemplary steps implemented by the trending module 465.

DETAILED DESCRIPTION

Figure 4:
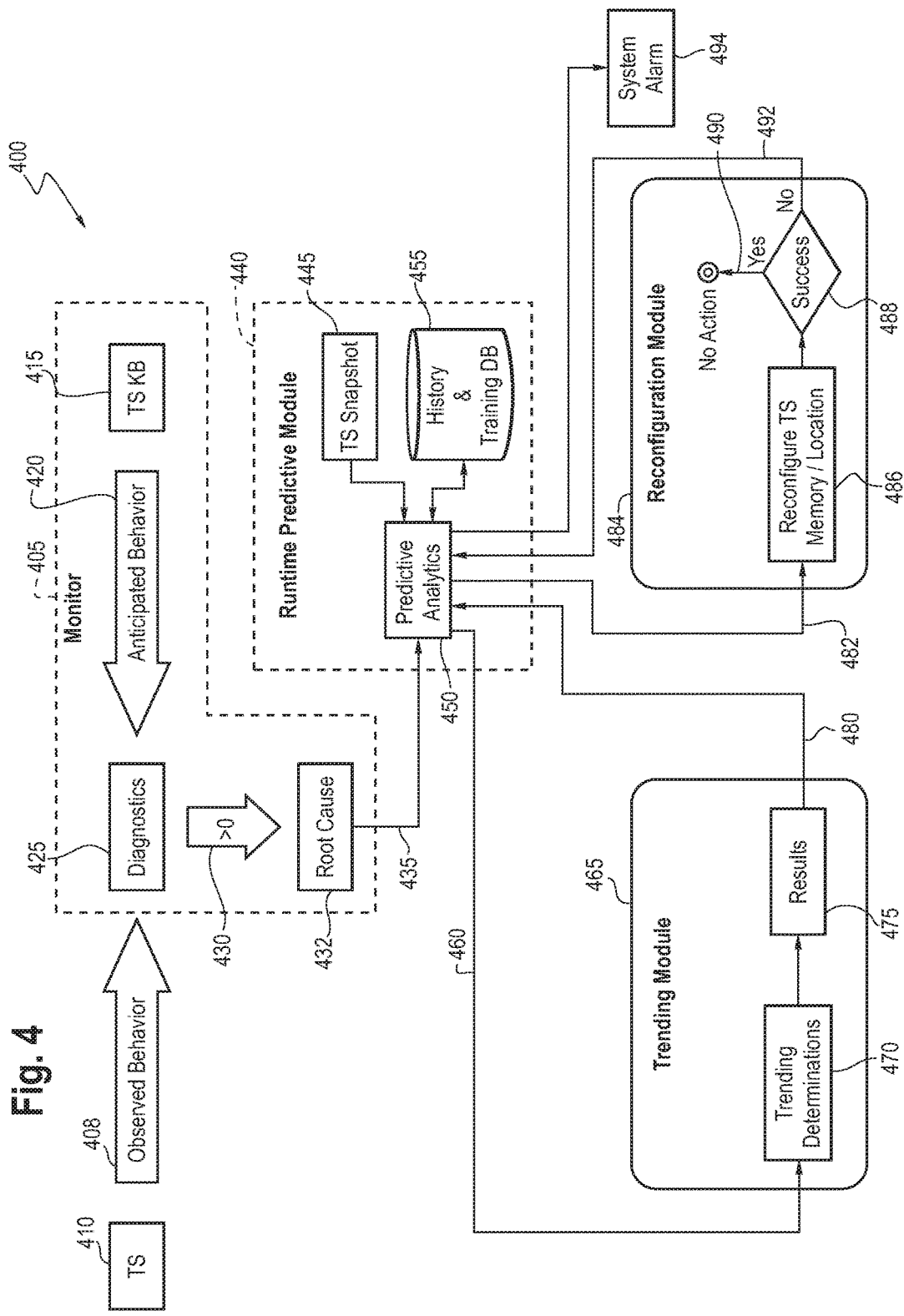
FIG. 4 is a representative diagram illustrating fault detection and recovery in accordance with an embodiment of the present invention.

It is believed that a general overview of the operation of an embodiment of the present invention will assist in understanding the more detailed description which follows. The illustrated embodiment of the present invention provides fault detection and fault isolation during the runtime execution of target software and preferably provides an ability to remediate and/or recover from a detected fault as the target software continues to execute. A knowledge database (XML representation) stores multiple parameters representing a model of the target software. Based on continuous and/or periodic observed behavior of the target software during execution, diagnostics are performed to determine if the observed behavior is within anticipated and approved behavior based on the model of the target software stored in the knowledge database. If an anomaly is detected, i.e. one or more parameters and/or behaviors of the target software are not within the anticipated corresponding parameter and/or behavior based on information from the target software knowledge database, a root cause analysis is performed based on the particular anomalous behavior. This information is further analyzed to determine if a memory location utilized by the target software is identified as being associated with the anomaly. If a memory location utilized by the target software is identified as being associated with the anomaly and assuming it is possible to alter the values in this memory location during execution of the target software without causing a malfunction/crash of the target software, the identified memory location is altered, e.g. reset by replacing with current memory values with heuristic memory values learned over time or by initializing/"zeroing out" the memory values, in an attempt to remove the cause of the anomaly/fault and restore the target software to fault free operation while execution of the target software is continuously maintained. Although human input may be utilized to initially prepare the information stored in the target software knowledge database, the operation of the fault detection, fault isolation, and recovery techniques in accordance with the embodiment of the present invention operate continuously and automatically after initialization, i.e. without any human intervention, to safeguard the operation of the target software.

FIG. 1 illustrates an exemplary computing environment with a computer 100 that includes a microprocessor 105, read-only memory (ROM) 110, random-access memory (RAM) 115, and nonvolatile memory storage device 120. An input/output module 125 provides an interface for communications between the microprocessor 105 and devices outside of computer 100. Input devices 130 include all forms of providing information to computer 100, e.g. keyboards, mouse, interactive screens, etc. Output devices 135 include all forms of devices which may accept information from computer 100, e.g. display monitors, readouts, printers, etc. A communication link 140 may include various forms of communication channels with external devices/systems 145. The communication link 140 may comprise wired, optical, wireless, etc., communication channels suited for communications with the external devices/systems 145, e.g. other computing systems, databases, etc.

Typically, boot software located in ROM 110 is loaded on initial activation of computer 100 followed by the loading of an operating system which may be contained in ROM 110 or nonvolatile memory 120. Higher-level application programs such as the target software and the fault detection and recovery software may be typically loaded from the nonvolatile memory 120 into RAM 115 for execution. The embodiment of the present invention may reside in the same hardware system as the target software such as the system shown in FIG. 1, or it may reside in separate computing hardware from the target software with communications being established between the systems in order to allow monitoring of target software values and parameters, and permitting modifications of the values/parameters to resolve a detected fault/failure condition of the target software.

FIG. 2 shows an exemplary partial state diagram such as might be associated with the target software. As shown, the execution of state Si may result in the process transferring to state S2 or state S3. The execution of state S2 may result in the process continuing at state S4 or state S5. The execution of state S3 may result in the process continuing at state S5 or state S6. These states as described are consistent with the normal anticipated operation of the target software and hence the modeling of the target software will reflect these states and possible change of states as valid in the associated knowledge database.

State S7, shown in dashed lines, illustrates a state between and transitioning from state S1 to state S5 and represents an unanticipated operation of the target software. Hence the modeling of the target software will not reflect this potential state or the transition as being valid. State S7 may arise from different conditions. For example, state S7 may represent a later valid update of the target software that includes state S7, but for which the knowledge database representing the modeling of the target software has not been updated. Alternatively, state S7 may represent a form of "malware" such as a Trojan or Virus that has infected the target software and seeks to control the transition from state S1 to state S5 without passing through state S2 or state S3 as intended by the original design of the target software. From the perspective of the target software model, state S7 represents an anomaly from the intended operation of the target software and will be identified as an anomaly to be diagnosed for consideration for a potential remedy and/or alarm. It will be understood that the state S7 represents only an exemplary variance and that a variety of types of variances are possible. For example, malware may infect one of the states S1-S6 in a way that alters the conditions upon which a particular next state is entered and/or may cause a different following state to be entered than was originally intended. Alternatively, malware which infects one of the states may link that state to a totally different state or location not part of the original target software. Therefore, to detect an anomaly in the operation of the target software, the model of the target software contained in the knowledge base should include various parameters, properties and states of the target software since this is the information that will be relied upon to make comparisons with the corresponding parameters, properties and states of the executing target software.

FIG. 3 shows an exemplary memory map 300 that may assist in a better understanding of another aspect of the embodiment of the present invention. The shown sections of this memory represent the amount of memory (represented as area) utilized for the respective software and also provide an indication of the relative location or memory address range where the software resides. The boot software resides in section 305 and the operating system software resides in section 310. The target software resides in section 315. The fault detection and recovery software resides in section 320.

Examples are provided to show illustrative anomalies, i.e. out of bounds amounts/locations of memory as compared to the memory model for the target software 315. In accordance with the memory map model of the target software as contained in the fault detection and recovery software, an amount of memory 325 is allocated to contain a specified parameter or value. However, the specified parameter or value occupies an additional amount of memory 330 beyond the anticipated amount of memory 325. This additional memory may represent an excessive out of bounds value or parameter, or may represent memory occupied by some form of malware. Memory portion 335 represents additional memory located at an address outside of the anticipated map of memory 315 for the target software. This may represent an infection of malware that is addressed and executed by a redirection pointer located in the memory segment 315. Anomaly 330 can be detected based on a comparison of the maximum amount of memory allowed for parameter 325 by the model and the actual memory utilized. Anomaly 335 may be detected based on a comparison of the memory address range allowed by the model of the target software and the memory addresses of section 335 which are outside the allowed address range. The amount of memory allocated for specified parameters and software modules as well as the range of memory addresses associated with the anticipated operation of the target software are merely two examples of variances between the anticipated operation of the target software and anomalies that may be identified based on a comparison of the model parameter ranges/values to actual corresponding parameter ranges/values used by the executing target software.

FIG. 4 is a representative diagram 400 illustrating the fault detection and recovery in accordance with an embodiment of the present invention. It will be appreciated that the modules/blocks, except as indicated, represent software routines that perform the indicated analysis or function. A fault detection (FD) monitor 405 receives data 408 representing a plurality of observed behaviors of the target software (TS) 410, e.g. runtime parameters, properties, states, amount of memory associated with defined segments of the TS, memory map address ranges for the segments of the TS, etc. The data 408 are defined by a TS system specification which will be specific/unique for the particular TS to be monitored. The FD monitor 405 includes a TS knowledge base (KB) 415 containing a plurality of files with runtime parameters, properties, states, minimum and maximum amounts of memory associated with various segments of the TS, permitted memory map address ranges for the segments of the TS, etc. Data 420 from TS KB 415 defines a plurality of anticipated runtime behaviors and/or boundaries of the TS. This data is received as inputs by the diagnostics module 425. The TS KB stores ranges of parameters associated with acceptable behaviors of the target software.

The diagnostics module 425 identifies and segregates from data 408 the different types of observed behaviors, identifies corresponding anticipated behaviors for the observed behavior types, makes a comparison of the plurality of observed behaviors 408 with corresponding anticipated behaviors 420, and provides an output 430 that identifies if any of the observed behaviors are outside the bounds of the corresponding anticipated behaviors. If there are any observed behaviors that are outside the bounds of the corresponding anticipated behaviors, the parameters, properties and states giving rise to such out-of-bounds observed behaviors are provided to the root cause module 432.

Continuous and discrete data 408 that represent the system under test, i.e. the TS, are the inputs to the Diagnostics module 425. There are specific parameters, variables, and attributes in the models that are representative of these data and their behaviors. These parameters are extracted/parsed from the data by the Diagnostics module 425 from a stream of data 408 that may be carried on various data buses. For example, an Application Programmers Interface (API) may provide a link between the TS and Diagnostics Module 425 to define the protocol/format of the types of data 408 so that the Diagnostics module can easily identify the types of data being received. In this case the TS is considered as an exterior system from the perspective of the Diagnostics module and the data 408 is extracted in a passive mode by the Diagnostics module 425. Alternatively, the TS can be considered to be an interior system in which case the retrieval of the data 408 by the Diagnostics module 425 from the TS will be mapped out and sent with corresponding communications between the TS and the Diagnostics module 425.

If the TS is configured as a state driven machine, changes or failure to change states of the TS is another technique to identify normal vs. failed components. The states may also include information on invariant parameters. With continuous monitoring of the data 408, a snapshot of the entire TS system can be taken at any specified instance.

Any off-nominal behavior is represented as a possible "degrading value" which implies the onset of software functional failures that could cause other failures including cascading failure events that start but take time to complete. The time measurement analysis for software with a failure having been detected may be represented as a quantifiable measurement, i.e. a probability of additional failures during a predetermined time interval. The original raw data 408 may be stored locally in the computer non-volatile memory so that it can be accessed by other modules. The Diagnostics module 425 provides data 430 for all identified fault indications to the root cause module 432. Additionally, a characteristic residual function is provided that can be used to determine a trend of future behavior of the software based on a snapshot of the past and current conditions including the related parameters, variables, attributes, and states of TS. The root cause analysis module 432 is triggered for any non-zero result, i.e. any abnormal behavior, based on comparisons made by the diagnostic module 425. The Diagnostics Module 425 passes analyzed fault data 430, referred to as symptom(s), to root cause module 432 which determines fault isolation for related corresponding software/hardware and compares possible interactions and influences upon the TS that could be rise to the observed symptom(s) to determine possible root causes of symptom(s). The root cause module 432 attempts to identify and isolate to localized code, external influencing code (could be a Trojan for instance), and/or hardware interactions causing the Symptom(s). Root cause module 432 may also use the raw data 408 stored locally to verify and validate the Symptom(s) of implicated software/hardware interactions. The Root Cause analysis module 432 uses filtering algorithms (i.e., Kalman Filters, Group Fault Analysis, etc.) to assist in identifying the cause of the symptom. An alarm 435, along with root cause information determined by root cause module 432, is passed to predictive analytics module 450.

The runtime predictive module 440 includes the predictive analytics module 450 that receives the parameters, properties and states associated with the anomalous behavior 435 from the root cause module 432. The predictive analytics module 450 predicts the future state of the TS using past, current and historically learned behavior of the TS available from the History and Training database 455. The history and training database 455 contains a history of parameters, properties and states as observed from prior operation of the TS. Module 450 runs various time series analysis and filters on the data to determine the future "next state" of TS. It also keeps track of the past and current states in a small time window and future time horizon. Snapshots in time of the execution trace are generated by TS Snapshot module 445 and compared against any historically similar execution trace snapshots when a fault is detected. The data on faults/failures is transmitted to Trending module 465 to determine if the trend is for the possible end state (termination of associated failures) of a fault. This data is also transmitted for storage in the History and Training database 455 for future use in historic analysis and training. As more symptoms occur (e.g. cascading related chain of symptoms) the frequency of snapshots taken by TS Snapshot module 445 increases to allow finer granularity of the time-series analysis of faults and their causing cascading fault/failure events. These may be subsequently used for off-line training and learning of TS behavior (some systems, e.g. aircraft avionics systems, do not allow learning to occur in real-time). A switch in TS Snapshot module 445 allows/disallows training and learning of TS in real-time. Each trained/learned anomalous behavior is represented as incremental refinement and update of the XML representation of TS model. Preferably, these refinements will be entered into the software requirements documentation for TS. The predictive analytics module 450 predicts a probability of successfully restoring an anomalous behavior to acceptable behavior during continuous execution of the target software by replacing first bytes stored in memory and associated with the execution by the target software of the anomalous behavior with other bytes. The probability prediction is at least partially based on accuracy of previous historical predictions of future states of the target software based on past and current state models at a time just prior to the future state prediction of the target software.

The predictive analytics module 450 accesses the history available at the history and training database 455 and determines if the current parameters, properties and states are the same as or similar to corresponding parameters, properties and states during earlier execution of the TS. If a same or similar set of properties is not found in database 455 that matches the current set of properties, the predictive analytics module 450 routes the parameters, properties and states on output 460 to the trending module 465. The data 460 is identical to data 435 plus the "near states" of the faulty software behavior.

The trending module 465 spawns off new transition threads for each software fault detected. Trending determination module 470 determines the states/parameters and possible "end state" associated with a particular fault. For software failures, this information data is transmitted on output 470 and the results module 475 collects the pertinent data as well as previous analyses and transmits it back to the predictive analytics module 450 via data 480 to be stored in the history and training database 455. A system alarm is generated by the predictive analytics module 450 and displayed on system displays 494. For all time critical failures, a different alarm is displayed along with data for time to failure and confidence of results indicated as a percentage probability number. Output 494 includes for display/recording a cumulative human readable reproduction of the symptoms, root cause analysis, implicating memory addresses and values, and log files.

The predictive analytics module 450 transmits on input 482 to the reconfiguration agent 484 the memory addresses and values of memory of the TS memory to be reconfigured/replaced. Input 482 also contains the time & spatial sequence for replacement if there are multiple addresses and values to be replaced. Memory reconfiguration module 486 of the reconfiguration module 484 then proceeds to implement the memory replacement. Generally the memory is replaced by equivalent well-formed state of TS addresses and values. Zeroing out of the memory only occurs for Trojans, worms, and viruses infecting the software. As used herein, "zero out" means to write a series of zero values into each bite of memory within a predetermined address range of memory. Anomalous behaviors can also occur as abrupt failures (e.g. software error dumps and loss of execution).

The Reconfiguration Module 484 attempts to solve non-abrupt failures before the loss of continuing execution by the TS. In case the reconfiguration module 484 is not able to solve this situation in real time, it will attempt to reboot the software system and return safely to a functional state just before the loss of execution, i.e. states as stored in history and training database 455. A snapshot of observed data vs. historic stored data is vital to quick decision making in milliseconds (or lower time scales) vs. seconds and achieving success by reconfiguration module 484. Learning from possible failure outcomes of TS is necessary for predicting future states of the system in module 484 and module 465 which discerns trends for possible outcomes and provides this information to module 484. Learning algorithms, e.g. Bayesian algorithms, SVN, Regressions, decision trees, etc., are applied to promote better outcomes.

Following the memory reconfiguration, a success determination module 488 determines if the reconfiguration was successful (YES) or not. A successful memory reconfiguration means that the TS execution continues and that there are no further faults/anomalies linked to the memory that was reconfigured. Assuming the reconfiguration was successful (YES), no additional action is required as indicated at 490. A NO determination, indicating that the memory reconfiguration was not successful, is transmitted on output 492 to the predictive analytics module 450. The NO determination coupled with validation from the TS snapshot 445 results in the predictive analytics module 450 generating a system alarm 494 indicative that the anomaly not been able to be automatically remedied. The output 492 includes a binary signal and analyzed data for human operators to consider manual intervention, e.g. before failure occurs. The analyzed data contains root cause analysis, the future states, and confidences in the predictions of the future states in human readable form. In case of unresolved failures for predicted future states, manual intervention may be required. Log files are also generated that are similar to software fault and failure dumps (stack and heap).

FIG. 5 shows exemplary steps implemented by the predictive analytics module 450. Beginning with START 505, the data from the fault detection monitor is analyzed at step 510. This includes access to real-time data, parameters, variables, signals, snapshots, trace elements, time & space (memory, virtualized memory, etc.) synchronization and time-series analysis of FD Monitor data as provided on output 435. In step 515 Markov state models (of past, current states, and near future states) and corresponding state machines with corresponding confidence levels are generated based on the information received from output 435, information from the TS snapshot 445 and the history and training database 455, and the trending data received on output 480. In step 520 information generated as described in step 515 is transmitted to the trending determinations module 465 for trend analysis over larger time intervals. The process terminates at END 525.

FIG. 6 shows exemplary steps implemented by the trending module 465. Beginning at START 605, confidence levels for predicted future states are compared with predetermined thresholds at step 610. In step 615 a determination is made of whether the thresholds have been met, i.e. does a confidence level associated with a predetermined threshold exceed that threshold? A NO determination at step 615, indicating the associated confidence level has not exceeded a corresponding threshold, results in the system failure alarm being set as indicated at step 620. A YES determination by step 615 results in step 625 determining replacement memory values and addresses, and timing and spatial sequence therefore. Upon the memory replacement, step 630 determines whether the memory replacement was successful. Memory replacement is determined to be successful when the TS continues to execute and no further faults/anomalies are detected associated with the subject memory replacement. A NO determination by step 630 again results in the system failure alarm being set. A YES determination by step 630 results in termination at END 635.

The trending module 460 produces a new future state from data and indicators from predictive analytics module 450 based on: time spent in specified states; the determined transitional probability of current state; changes in probability to reach any other state; specific state transition pattern changes; time to reach a Markov state; change in other Markov parameters; the determined conditional probability from influences as obtained from previous history; the determined confidence in probability of occurrence of new state(s); and provides the determined analysis to predictive analytics module 450 as output 480.

The apparatus in one example employs one or more computer-readable signal-bearing tangible media. The tangible media stores software for performing one or more portions of one or more embodiments of the invention. The media for the apparatus in one example comprises a medium that stores non-transient data as magnetic, electrical, optical, biological, or atomic representations.

Although exemplary implementations of the invention have been depicted and described in detail herein, it will be apparent to those skilled in the art that various modifications, additions, substitutions, and the like can be made without departing from the spirit of the invention.

The scope of the invention is defined in the following claims.

The invention claimed is:

1. A computer implemented method for automatically curing a detected anomaly in executing target software during the continuing execution of the target software, the method comprising the steps of:

storing ranges of parameters associated with acceptable behaviors of the target software;

detecting at least one behavior of the executing target software having a corresponding first parameter that is outside the stored range of parameters for acceptable behavior for the corresponding at least one behavior;

predicting a probability of successfully restoring the at least one behavior to acceptable behavior during continuous execution of the target software by replacing first bytes stored in memory and associated with the execution by the target software of the at least one behavior with other bytes, the probability prediction at least partially based on accuracy of previous historical predictions of future states of the target software based on past and current state models at a time just prior to the future state prediction of the target software;

replacing the first bytes with the other bytes upon the predicted probability of successfully restoring the at least one behavior to acceptable behavior exceeding a predetermined success threshold, thereby automatically attempting to cure a detected anomaly in the target software during the continuously executing target software.

2. The computer implemented method according to claim 1 wherein the first parameter is a range of memory addresses containing the first bytes, the replacing step deleting the first bytes from memory in the target software and writing the other bytes within a range of memory that is within an acceptable behavior for containing the first bytes.

3. The computer implemented method according to claim 1 wherein the first parameter is a location of a memory address containing the first bytes, the replacing step deleting the first bytes from memory at said location in the target software and writing the other bytes at another memory location that is within an acceptable behavior for containing the first bytes.

4. The computer implemented a method according to claim 1 wherein the other bytes are stored in memory and derived from historically utilized bytes that perform a function associated with the first bytes.

5. The computer implemented a method according to claim 1 further comprising the steps of:
   determining first time intervals during which the first bytes have been accessed by the target software;
   predicting when the target software will next access the first bytes, and;
   the replacing step replacing the first bytes at a time during which the target software is predicted not to be accessing the memory containing the first bytes.

6. The computer implemented a method according to claim 1 further comprising setting an alarm upon replacement of the first bytes with the other bytes not resulting in an associated acceptable behavior.

7. A computer program product, comprising a computer usable non-transitory medium having a computer readable program code embodied therein, said computer readable program code adapted to be executed to implement a method for automatically curing a detected anomaly in executing target software during the continuing execution of the target software, said method comprising:
   storing ranges of parameters associated with acceptable behaviors of the target software;
   detecting at least one behavior of the executing target software having a corresponding first parameter that is outside the stored range of parameters for acceptable behavior for the corresponding at least one behavior;
   predicting a probability of successfully restoring the at least one behavior to acceptable behavior during continuous execution of the target software by replacing first bytes stored in memory and associated with the execution by the target software of the at least one behavior with other bytes, the probability prediction at least partially based on accuracy of previous historical predictions of future states of the target software based on past and current state models at a time just prior to the future state prediction of the target software;
   replacing the first bytes with the other bytes upon the predicted probability of successfully restoring the at least one behavior to acceptable behavior exceeding a predetermined success threshold, thereby automatically attempting to cure a detected anomaly in the target software during the continuously executing target software.

8. The computer program product of claim 7 wherein the method implemented by the computer readable program code comprises the first parameter being a range of memory addresses containing the first bytes, the replacing step deleting the first bytes from memory in the target software and writing the other bytes within a range of memory that is within an acceptable behavior for containing the first bytes.

9. The computer program product of claim 7 wherein the method implemented by the computer readable program code comprises the first parameter being a location of a memory address containing the first bytes, the replacing step deleting the first bytes from memory at said location in the target software and writing the other bytes at another memory location that is within an acceptable behavior for containing the first bytes.

10. The computer program product of claim 7 wherein the method implemented by the computer readable program code comprises the other bytes being stored in memory and derived from historically utilized bytes that perform a function associated with the first bytes.

11. The computer program product of claim 7 wherein the method implemented by the computer readable program code comprises the steps of:
   determining first time intervals during which the first bytes have been accessed by the target software;
   predicting when the target software will next access the first bytes, and;
   the replacing step replacing the first bytes at a time during which the target software is predicted not to be accessing the memory containing the first bytes.

12. The computer program product of claim 7 wherein the method implemented by the computer readable program code comprises setting an alarm upon replacement of the first bytes with the other bytes not resulting in an associated acceptable behavior.

* * * * *